United States Patent
Minenko et al.

(10) Patent No.: US 7,010,748 B1
(45) Date of Patent: Mar. 7, 2006

(54) METHOD AND SYSTEM FOR DISPLAYING SITE-SPECIFIC BOOKMARKS ON A COMPUTER

(75) Inventors: Vladimir Minenko, Munich (DE); Jean Schweitzer, Saarbruecken (DE)

(73) Assignee: Siemens Aktiengesellschaft, Munich (DE)

( * ) Notice: Subject to any disclaimer, the term of this patent is extended or adjusted under 35 U.S.C. 154(b) by 590 days.

(21) Appl. No.: 10/070,166

(22) PCT Filed: Sep. 1, 2000

(86) PCT No.: PCT/DE00/03007

§ 371 (c)(1),
(2), (4) Date: Mar. 4, 2002

(87) PCT Pub. No.: WO01/18490

PCT Pub. Date: Mar. 15, 2001

(30) Foreign Application Priority Data

Sep. 3, 1999 (DE) ................................ 199 42 173

(51) Int. Cl.
*G06F 3/00* (2006.01)
(52) U.S. Cl. ................ 715/739; 715/811; 715/825; 715/745; 715/747
(58) Field of Classification Search .............. 715/739, 715/745, 747, 821, 810–814, 825; 707/3–7; 455/414.1–414, 414.2, 414.3, 456.1, 456.2, 455/456.3, 556.2; 701/201–226; 345/739, 345/745, 747, 810–814, 821, 825
See application file for complete search history.

(56) References Cited

U.S. PATENT DOCUMENTS

| | | | | |
|---|---|---|---|---|
| 5,767,795 A | * | 6/1998 | Schaphorst | 340/988 |
| 5,910,799 A | | 6/1999 | Carpenter et al. | |
| 5,930,472 A | | 7/1999 | Smith | |
| 6,091,956 A | * | 7/2000 | Hollenberg | 455/456.5 |
| 6,122,520 A | * | 9/2000 | Want et al. | 455/456.2 |
| 6,295,454 B1 | * | 9/2001 | Havinis et al. | 455/456.3 |
| 6,356,905 B1 | * | 3/2002 | Gershman et al. | 707/10 |
| 6,397,040 B1 | * | 5/2002 | Titmuss et al. | 455/67.11 |
| 6,522,875 B1 | * | 2/2003 | Dowling et al. | 455/414.3 |
| 6,677,894 B1 | * | 1/2004 | Sheynblat et al. | 342/357.1 |
| 6,783,459 B1 | * | 8/2004 | Cumbers | 463/29 |

FOREIGN PATENT DOCUMENTS

| | | |
|---|---|---|
| WO | WO97/07467 | 2/1997 |
| WO | WO98/59506 | 12/1998 |

OTHER PUBLICATIONS

"Conditional Hypertext Mark-Up Language Tags to Dynamically Change Web Pages", IBM Technical Disclosure Bulletin, vol. 39, No. 11, Nov. 1996.

* cited by examiner

*Primary Examiner*—Kristine Kincaid
*Assistant Examiner*—Le Nguyen
(74) *Attorney, Agent, or Firm*—Staas & Halsey LLP

(57) ABSTRACT

A method for displaying location-dependent bookmarks ascertains a location for the computer. For this location, corresponding bookmarks are determined and displayed on the computer.

17 Claims, 7 Drawing Sheets

METHOD AND SYSTEM FOR DISPLAYING SITE-SPECIFIC BOOKMARKS ON A COMPUTER

CROSS REFERENCE TO RELATED APPLICATIONS

This application is based on and hereby claims priority to PCT Application No. PCT/DE00/03007 filed on Sep. 1, 2000 and German Application No. 19942173.0 filed on Sep. 3, 1999, the contents of which are hereby incorporated by reference.

BACKGROUND OF THE INVENTION

The invention relates to a method and to a system for displaying location-dependent bookmarks on a computer.

When operating a computer, for example a personal computer, in a network group, for example the Internet, there are a multiplicity of addresses which can be accessed by the computer in the network group. In this context, a user uses these addresses purposefully, in order to satisfy particular information requirements. For better clarity, the addresses are stored as bookmarks in lists, with the lists preferably being able to be sorted according to subject in line with the user's preferences. When "browsers" are used, there are directories of bookmarks which can be grouped and sorted by the user on a suitable basis. In addition, there are also programs which merely provide support for managing the multiplicity of bookmarks. If the user has access to a fully functional computer, e.g. a personal computer, then it is a simple matter for him to find the bookmarks which he needs quickly on a commercially available screen. He can normally use the large screen and the many advance sorting options to obtain a good overview of the bookmarks, and can therefore quickly find the bookmark which he needs in a particular situation.

The situation is fundamentally different with a portable computer (e.g. with a Personal Digital Assistant=PDA): such an appliance normally has just a small display unit (display) which cannot show the same quantity of information as a conventional screen. In particular, the portable computer are usually used on a mobile basis, in which case, in particular, there is little time available for bookmarks.

International patent application WO 97/07467 discloses a computer system for identifying local resources in which a client computer sends location information to servers, and this server then zoom or move map information on the basis of the location information, and associated information relating to particular points on the map, for example in the form of hypertext, is adjusted as appropriate in the position shown.

International patent application WO 98/59506 discloses improvements in or relating to the distribution of information which involve establishing a current position for an enquirer via the telephone system, for example using the cell association with a mobile radio cell, and ascertaining from a database an http address for a local information server which then provides the enquirer with local information.

One object of the invention is to display bookmarks on a computer, with this display being geared, in particular, to the location of the computer.

The object may be achieved by specifying a method for displaying location-dependent bookmarks on a computer, in which a location is ascertained for the computer. For this location, corresponding bookmarks are ascertained and are displayed on the computer.

In one development, the bookmarks are used to access data in a network, in particular the Internet. In another development, the computer is a mobile computer.

One refinement relates to the location of the computer being ascertained using a global positioning system (GPS). Alternatively, the location can be determined over a mobile radio network, e.g. GSM, or over a wave LAN.

One particular refinement is that a bookmark corresponding to the location of the computer is determined as a result of the information linked to the bookmark being at a prescribed maximum distance from the location of the computer.

Another refinement is that resources of the computer are removed to a static system. This is suitable as a preference for small mobile appliances whose computation power and computation capacity are greatly restricted. For complex data access operations and search queries, it is possible to use the static system, which transmits the results of the storage or search query to the mobile system, in particular via a radio interface.

In this context, it should be noted that the (mobile) computer can communicate with the network using, in particular, a radio interface e.g. via DECT or GSM.

Another refinement is that bookmarks are stored with location information. This storage can be effected both in the (mobile) computer itself or in the network system. In the case of storage in the network group, the (mobile) computer uses a memory location which it interrogates preferably via the air interface, or triggers filter functions via the air interface and displays the result, which is in turn transmitted from the network to the computer.

In this context, it should be pointed out that the network preferably comprises a group of computers in which the plurality of computers interchange data with one another. In particular, in the case of storage and access to data in the network group, reference can be made to a (network) computer, by way of representation. An example of a large network group (network) is the Internet.

In one development, time information is additionally provided which is used to filter the bookmarks. This time information may, in particular, be suitable for automatically storing the last addresses visited and for offering them to the user when required. Using the combination of time information and location information, the user can be offered the last addresses visited, on the basis of the respective location. This allows fast and very efficient access to bookmarks which, on the basis of the repsective location, provide the user with information which is significant to him.

In general, an advantage of the location-related bookmarks is that the user does not need to search for the appropriate addresses on the (mobile) computer, but rather is offered the correct ones quickly. The related access to the data associated with the bookmarks increases the acceptance when handling the computer to the same extent as the efficiency is increased.

One example is a travel timetable query, which is very highly dependent on the location of the user. A travel timetable query can thus be made quickly and efficiently from a bus stop, for example. For this bus stop, the departure times and routes can be displayed and hence can inform the user quickly and easily about the time of arrival of the next bus and the rest of the route.

It should also be noted that the location information can be subdivided into cells of greater or lesser size. Thus, in a GSM radio network, for example, it is possible to obtain and provide location information accurate to the kilometer. A global positioning system can be used to request and provide location information accurate to several 10 m. The accuracy depends on the respective field of application and on the radio network used.

The bookmarks provided with the time information can be stored automatically or manually. Automatic storage works upon selection of the address concerned, i.e. the address visited is stored and provided with a time stamp and a location stamp. Accordingly, an address can also be stored explicitly.

One refinement is that a bookmark is linked to a functionality, e.g. "bus timetable". A content associated with this bookmark is determined dynamically, on the basis of the location and possibly the current time. One option in the "bus timetable" example would be the nearest stop's timetable with the next departure times and arrival times.

The object may be also achieved by specifying a system for displaying location-dependent bookmarks, in which a processor unit is provided which is set up such that a location can be ascertained for the computer. For the location, corresponding bookmarks can be ascertained and displayed.

This system is particularly suitable for carrying out the method or one of its developments explained above.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
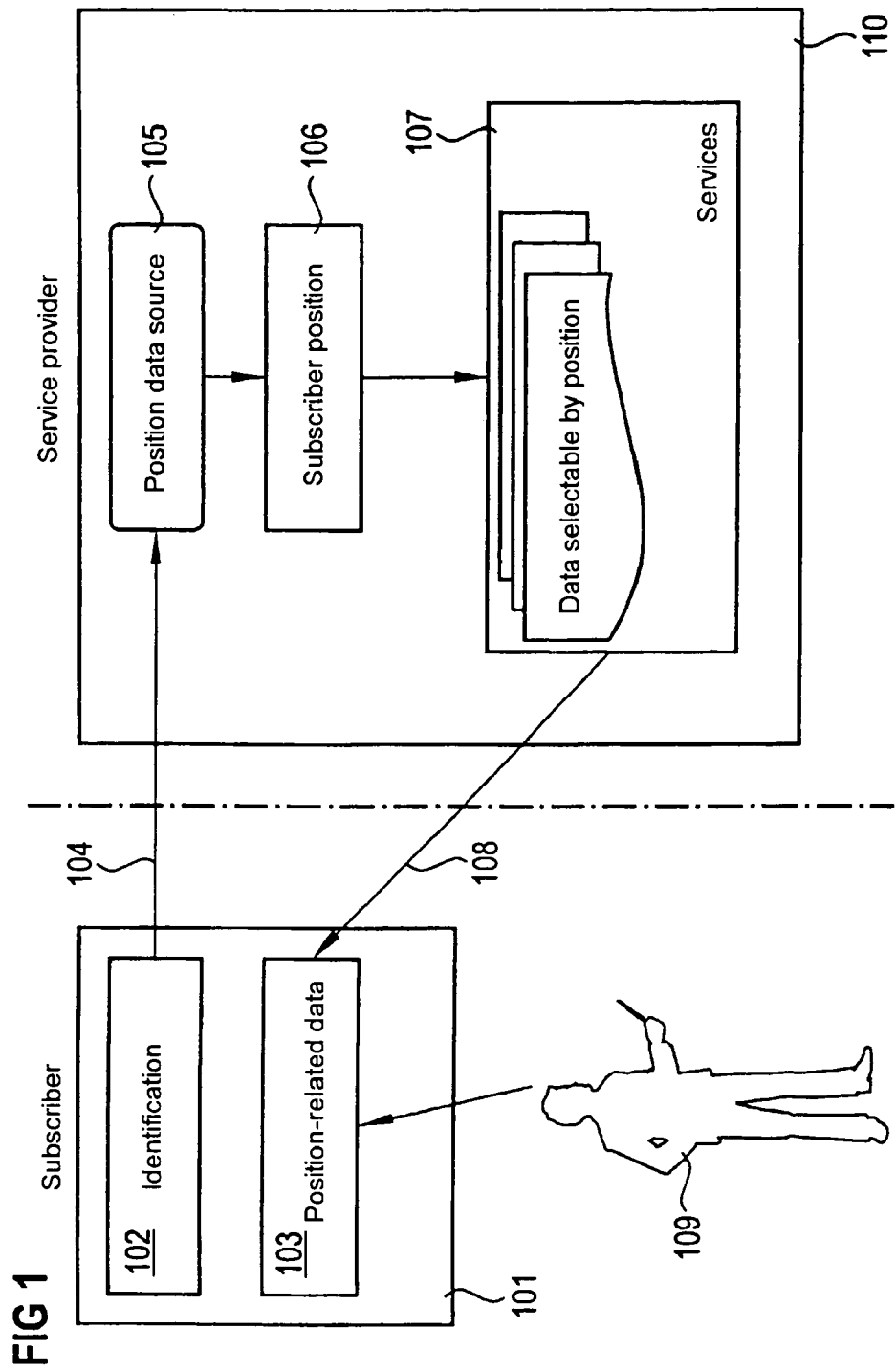
FIG. 1 shows a sketch illustrating a scenario for the mobile use of location-dependent services.

Reference will now be made in detail to the preferred embodiments of the present invention, examples of which are illustrated in the accompanying drawings, wherein like reference numerals refer to like elements throughout.

FIG. 1 shows a sketch illustrating a scenario for the mobile use of location-dependent services. A mobile computer 101, e.g. a Personal Digital Assistant (PDA), is operated by a user 109 in a mobile radio network, indicated by the radio interfaces 104 and 108. In this case, the mobile computer 101 accesses a network, in particular a network group 110, for example the Internet. In the "Internet as network group" scenario, it is customary for a subscriber, in this case the mobile computer 101, to access a service provider (Provider) on behalf of the network group 110. In this case, the service provider 110 responds, in particular, to the query 104 from the mobile computer 101 and transmits an appropriate response 108 back to the mobile computer 101.

In FIG. 1, the location of the computer 101 is ascertained (in block 105, 106) and, on the basis of this location, particular services 107 are offered.

Data 103 which is particularly dependent on the location of the computer 101 may be: travel information, emergency services (pharmacies, doctors), tourist attractions, hire cars, entertainment (cinema, theatre), consumer goods (department stores, shopping facilities).

Figure 2:
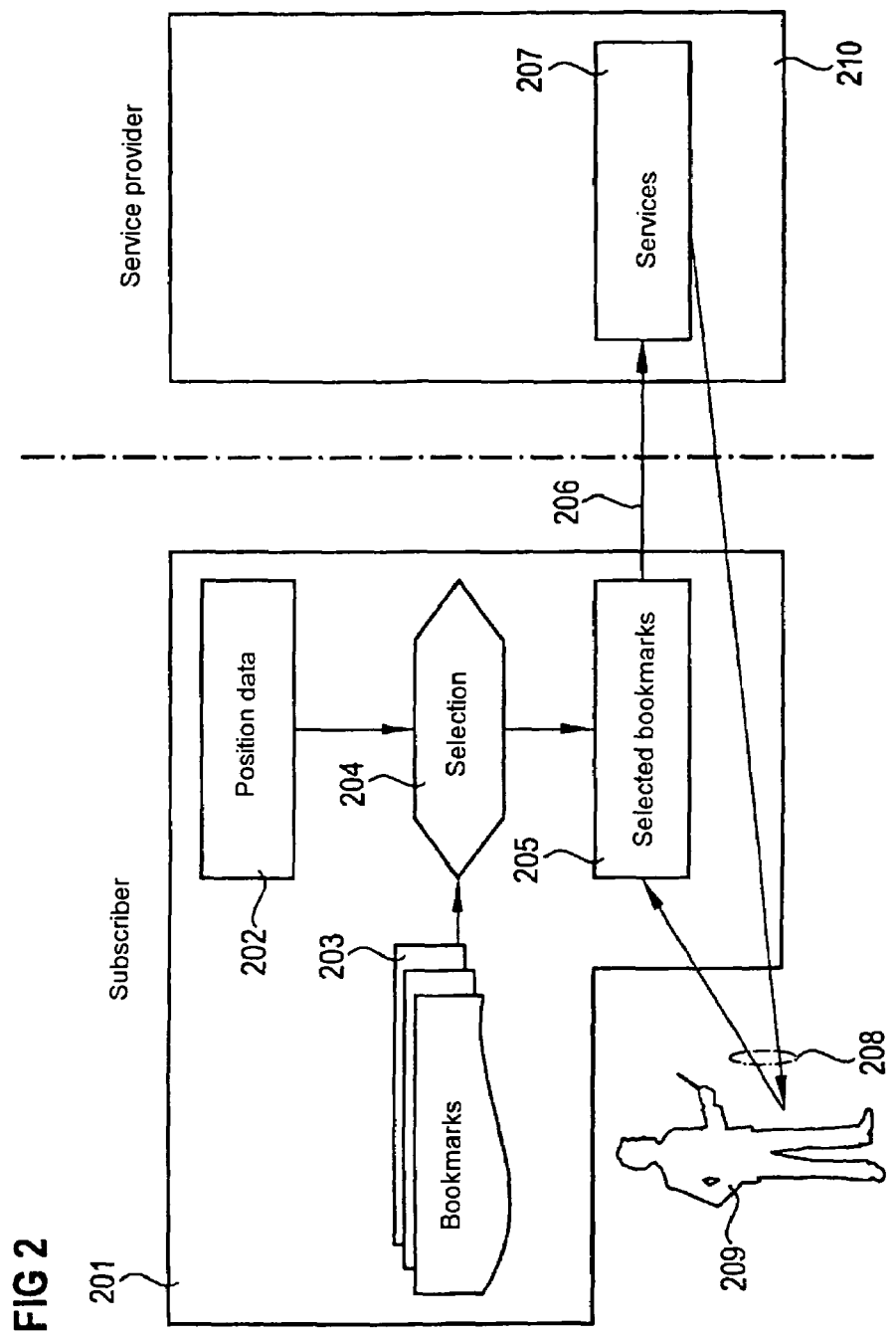
FIG. 2 shows a sketch illustrating a scenario for the display of location-dependent bookmarks on a computer, where the location information is ascertained by the computer.

FIG. 2 shows a sketch illustrating a scenario for the display of location-dependent bookmarks on a computer, where the location information is ascertained by the computer. The computer 201, in particular in the form of a mobile computer, ascertains its location 202 (location information) on the basis of data from a global positioning system (GPS). On the basis of its location 202, a selection 204 is made from the multiplicity of bookmarks 203 stored on a local basis, and hence the bookmarks 205 relevant to the location of the mobile computer 201 are displayed. Preferably, the bookmarks offered are those whose distance from the location 202 is below a prescribed threshold value. In addition, bookmarks which are independent of the location can be offered (e.g. bookmarks relating to world news).

The user 209 can select one of these relevant bookmarks 205. A communications interface, in this case a GSM channel 206, is used to transmit the address to a service provider 210, where a query 207 is started. This query 207 produces a result which is again transmitted via the GSM channel 208 to the user 209, in particular to the mobile computer 201.

Figure 3:
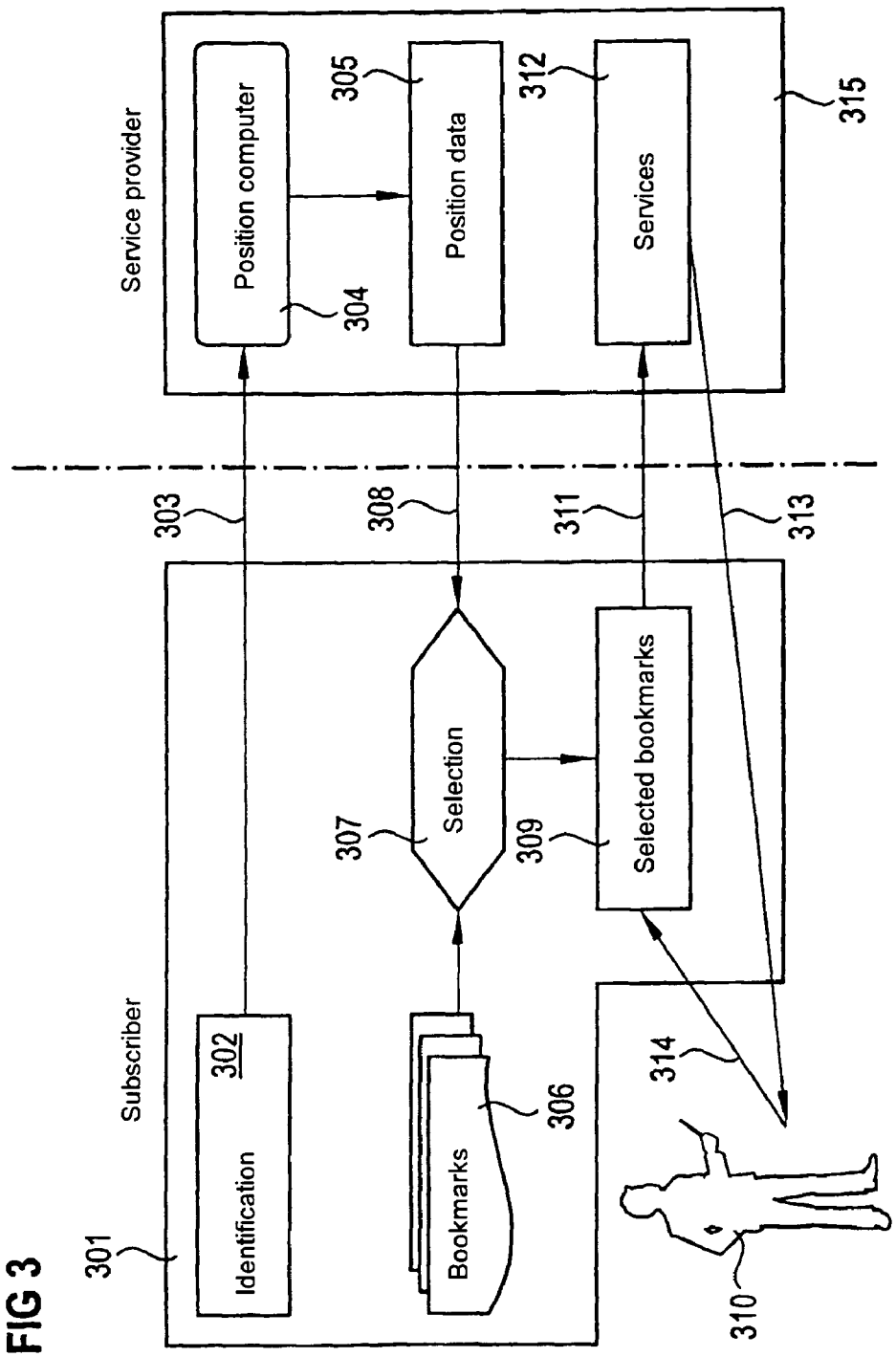
FIG. 3 shows a sketch illustrating a scenario for the display of location-dependent bookmarks on a computer, where the location information is ascertained by the network.

FIG. 3 shows a sketch illustrating a scenario for the display of location-dependent bookmarks on a computer, where the location information is ascertained by the network. Again, a mobile computer 301 is provided which identifies itself to a service provider 315 using an identifier 302 (identification data 102—see FIG. 1) which is unique to it. The service provider 315 issues a query and ascertains the position of the mobile computer 301 (see blocks 304 and 305). The GSM network, in which it is possible to ascertain the position of a subscriber, is suitable for this purpose. The full duplex radio interface is identified in FIG. 3 by the communication arrows 303, 308 and 311. The position data 305 ascertained by the service provider 315 is transmitted to the mobile computer 301. There, on the basis of the location information 305, a selection 307 is made from a multiplicity of bookmarks 306 stored on a local basis on the mobile computer 301. This results in a selection of bookmarks 309 which are relevant to the location and which the user 310 can use to retrieve particular information (indicated by the arrow 314). This query 314 is transmitted to the service provider 315 (transmission arrow 311) and is processed there (see block 312). The result 313 of the query 314 or 311 is transmitted back to the mobile computer 301 and is displayed to the user 310.

Figure 4:
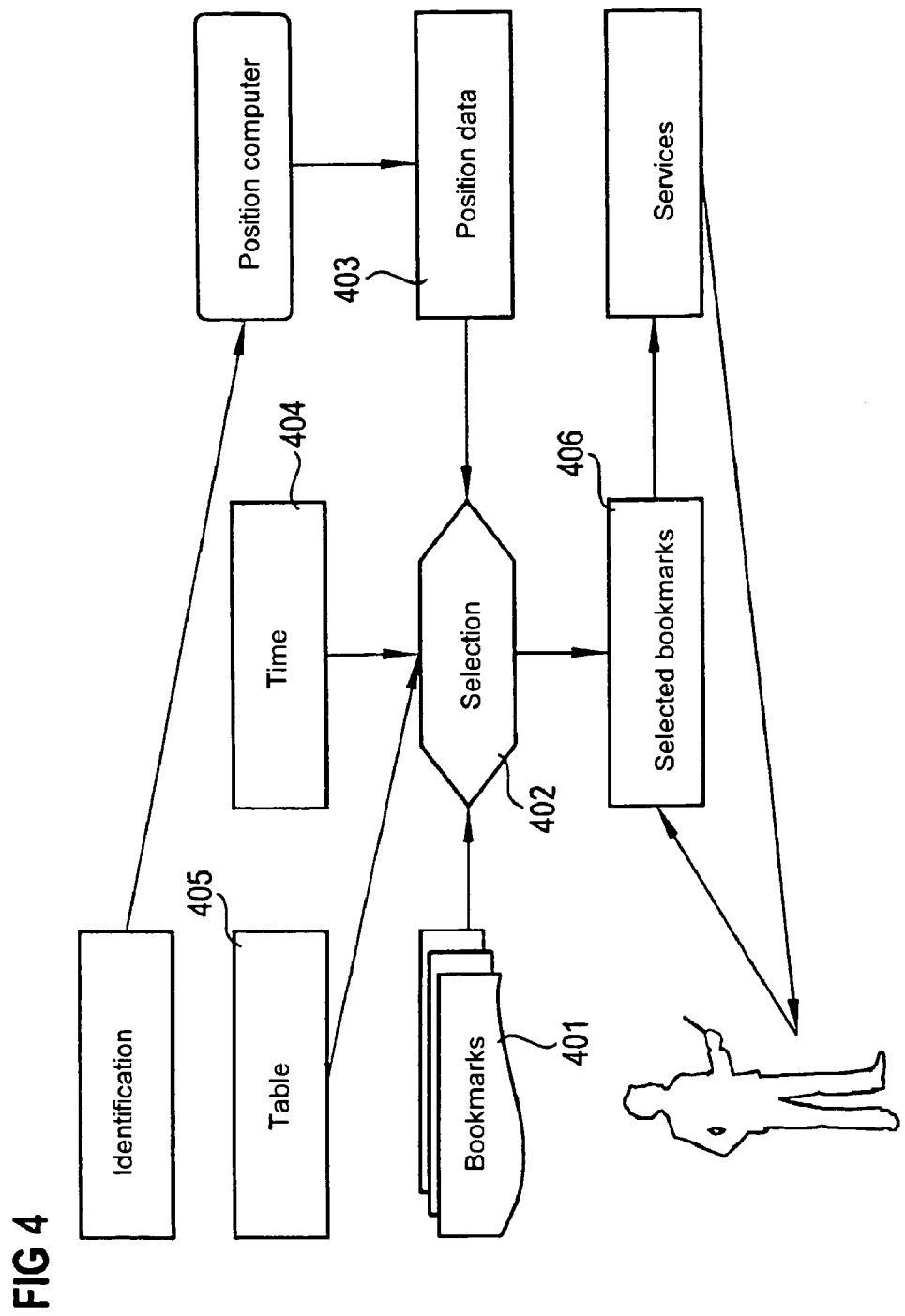
FIG. 4 shows a sketch illustrating a way of extending the above scenarios by time information.

FIG. 4 shows a sketch illustrating an extension of the above scenarios by time information. On the basis of FIG. 2 or FIG. 3, a selection 402 from a multiplicity of bookmarks 401 is made on the basis of the location information 403, of time information 404 and/or of a timetable 405. The result of the selection is bookmarks 406 matching the selection filter. The selection on the basis of the location information 403 delivers bookmarks matching the location of the mobile computer. In addition, these bookmarks are filtered with regard to their time stamp. By way of example, this may be a filter function of the following type: "The same bookmarks at the same location at the same time".

In addition, time planning can be effected in connection with the location, so that an appointment reminder 405 is issued automatically when paying a visit to the noted place. This appointment reminder 405 relates, in particular, to the query for a particular address in the network group. By way of example: "Every Monday, when visiting the XY area, start query with regional press service."

The filters 403 to 405 can be combined in any combination (and/or) with one another.

Figure 5:
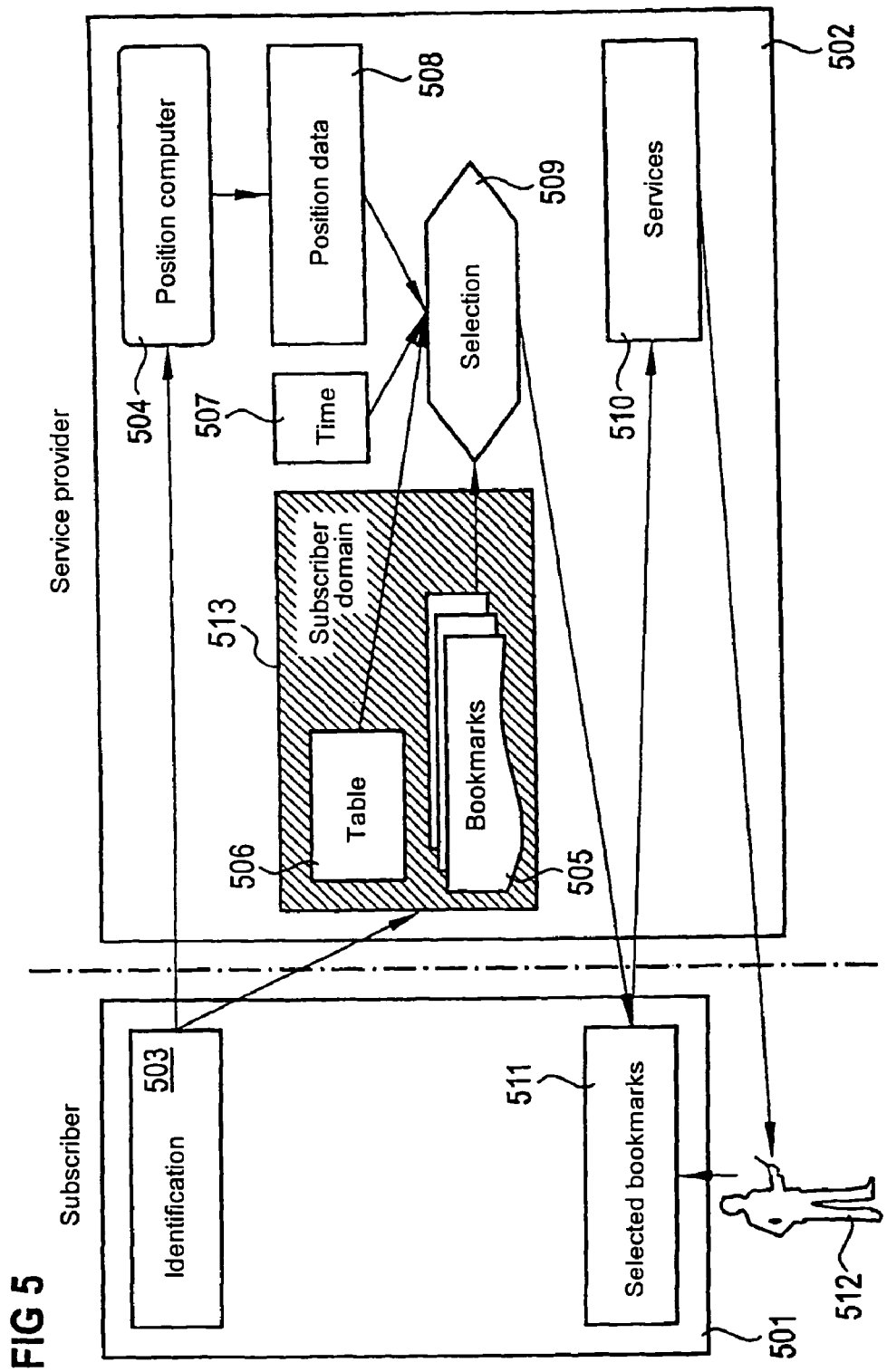
FIG. 5 shows a sketch illustrating a scenario in which fundamental functions of the computer are removed to the network.

FIG. 5 shows a sketch illustrating a scenario in which fundamental functions of the computer 501 are removed to the network 502. With a very low power mobile computer 501, it is advantageous to remove the computation- and memory-intensive operations to the network 502, which has plenty of resources.

The mobile computer 501 transmits its identifier 503 to the network 502. There, the position of the mobile computer 501 is firstly ascertained (see block 504), and secondly the bookmarks 505 stored by the network 502 are filtered in the manner described above (filter according to timetable 506, time 507 and position 508). The selection 509 delivers some of the bookmarks 505 back to the mobile computer 501. The user 512 selects a bookmark 511, and a query in the network 502 is started (block 510). The result is transmitted to the mobile computer 501 and hence to the user 512.

In this scenario, it is particularly advantageous for the mobile computer 501, optimized in terms of weight and user friendliness, to remove functions to the network 502. In the network 502, the mobile computer 501 is given an area 513 (domain) created for it which comprises all its bookmarks 505 and the timetable 506 which is characteristic of it. Preferably, other basic functionalities relating to additional storage of other bookmarks in the network 502 and to editing of these bookmarks are provided in the mobile computer 501.

Figure 6:
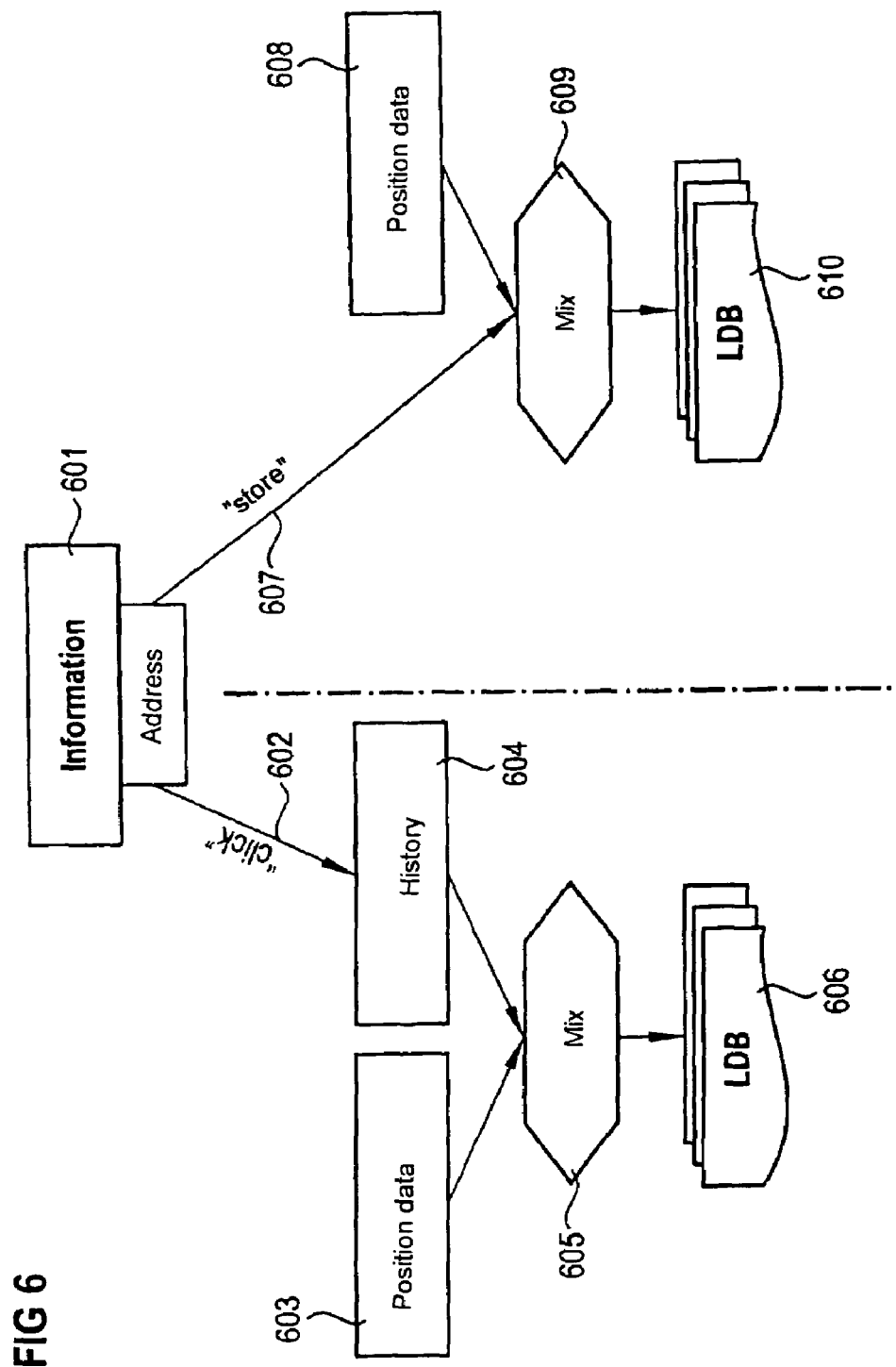
FIG. 6 shows a sketch illustrating two different methods for creating bookmarks.

FIG. 6 shows a sketch illustrating two different methods for creating bookmarks.

If the user is able to select information 601, that is to say is able to visit its associated address, this is done by explicit selection, in conventional network browsers by clicking on a highlighted destination address. This specific selection 602 causes, in particular, the time 604 at which the information was requested and the location 603, that is to say from where the information was requested, also to be logged. These two items of information—location 603 and time of the query 604—are stored together 605 with the destination address of the information 601. This is equivalent to automatic storage of bookmarks.

One alternative is explicit storage of bookmarks 607. In this case, for the bookmark which is to be stored, the location information 608, that is to say the location of the mobile computer, is requested and both the address and the location address are stored together 609 in the bookmarks 610.

Figure 7:
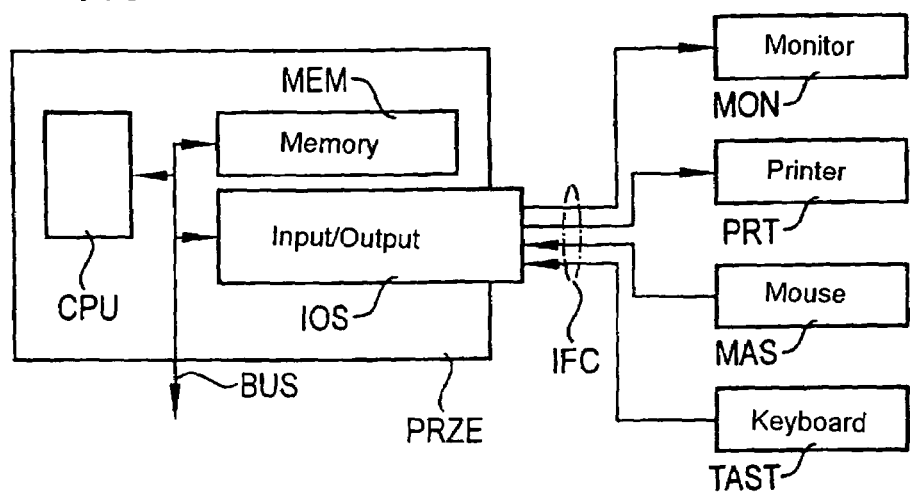
FIG. 7 shows a processor unit (computer).

FIG. 7 shows a processor unit PRZE. The processor unit PRZE comprises a processor CPU, a memory MEM and an input/output interface IOS which is used in various ways via an interface IFC: a graphics interface is used to visualize an output on a monitor MON and/or to output it on a printer PRT. Input is effected using a mouse MAS or a keyboard TAST. The processor unit PRZE also has a data bus BUS ensuring connection of a memory MEM, the processor CPU and the input/output interface IOS. Additional components can also be connected to the data bus BUS, e.g. an additional memory, data store (hard disk) or scanner.

The invention has been described in detail with particular reference to preferred embodiments thereof and examples, but it will be understood that variations and modifications can be effected within the spirit and scope of the invention.

What is claimed is:

1. A method for displaying location-dependent bookmarks on a computer, comprising:
    ascertaining a location of the computer;
    determining time information;
    ascertaining bookmarks corresponding to the location;
    filtering the bookmarks using the time information;
    displaying the bookmarks; and
    storing the bookmarks with location information.

2. The method as claimed in claim 1, wherein the bookmarks are used to access data in a network.

3. The method as claimed in claim 2, wherein the network is the Internet.

4. The method as claimed in claim 1, wherein the computer is a mobile computer.

5. The method as claimed in claim 1, wherein the location of the computer is ascertained using a GPS sensor.

6. The method as claimed in claim 1, wherein bookmarks corresponding to the location are determined by a prescribed distance between the information linked to the bookmark and the location.

7. The method as claimed in claim 1, wherein resources of the computer are moved to a static system.

8. The method as claimed in claim 1, wherein the bookmarks are stored.

9. The method as claimed in claim 8, wherein the bookmarks are stored automatically.

10. The method as claimed in claim 8, wherein the bookmarks are stored manually.

11. The method as claimed in claim 3, wherein the computer is a mobile computer.

12. The method as claimed in claim 11, wherein the location of the computer is ascertained using a GPS sensor.

13. The method as claimed in claim 12, wherein bookmarks corresponding to the location are determined by a prescribed distance between the information linked to the bookmark and the location.

14. The method as claimed in claim 13, wherein resources of the computer are moved to a static system.

15. The method as claimed in claim 14, wherein time information is additionally provided which is used to filter the bookmarks.

16. The method as claimed in claim 15, wherein the bookmarks are stored.

17. A system for displaying location-dependent bookmarks, comprising:
    a) a locator to ascertain a location of the computer; and
    b) a unit to ascertain bookmarks corresponding to the location of the computer, to obtain time information, to filter the bookmarks using the time information, to display the bookmarks, and to store the bookmarks with the location information.

* * * * *